(12) United States Patent
Amit

(10) Patent No.: US 12,346,568 B2
(45) Date of Patent: Jul. 1, 2025

(54) PUBLISHED FILE SYSTEM AND METHOD

(71) Applicant: VOLUMEZ TECHNOLOGIES LTD., Tel Aviv (IL)

(72) Inventor: Jonathan Amit, Omer (IL)

(73) Assignee: VOLUMEZ TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 18/273,194

(22) PCT Filed: Jan. 25, 2022

(86) PCT No.: PCT/IL2022/050099
§ 371 (c)(1),
(2) Date: Jul. 19, 2023

(87) PCT Pub. No.: WO2022/157782
PCT Pub. Date: Jul. 28, 2022

(65) Prior Publication Data
US 2024/0095211 A1    Mar. 21, 2024

Related U.S. Application Data

(60) Provisional application No. 63/141,133, filed on Jan. 25, 2021, provisional application No. 63/141,139, (Continued)

(51) Int. Cl.
*G06F 3/06* (2006.01)
*G06F 9/50* (2006.01)
(Continued)

(52) U.S. Cl.
CPC .......... *G06F 3/0614* (2013.01); *G06F 3/061* (2013.01); *G06F 3/0619* (2013.01);
(Continued)

(58) Field of Classification Search
CPC ...... G06F 3/0614; G06F 3/061; G06F 3/0619; G06F 3/0622; G06F 3/0631; G06F 3/064;
(Continued)

(56) References Cited

U.S. PATENT DOCUMENTS

| 5,721,840 A | 2/1998 | Soga |
| 6,714,980 B1 | 3/2004 | Markson et al. |

(Continued)

FOREIGN PATENT DOCUMENTS

| EP | 1577736 A2 | 9/2005 |
| EP | 3404527 A1 | 11/2018 |

(Continued)

OTHER PUBLICATIONS

Communication Pursuant to Article 94(3) EPC issued in European Application No. 22742390.2 dated Jun. 12, 2024, 8 pages.

(Continued)

*Primary Examiner* — Phong H Nguyen
(74) *Attorney, Agent, or Firm* — Cozen O'Connor

(57) ABSTRACT

A designated orchestrator configured to publish multiple snapshot data versions configured to be exposed to designated reader server/s and thus allow for a multi-task data writing ability which is able to be simultaneously conducted while a previous data snapshot is being iterated.

20 Claims, 3 Drawing Sheets

Related U.S. Application Data filed on Jan. 25, 2021, provisional application No. 63/141,151, filed on Jan. 25, 2021, provisional application No. 63/141,155, filed on Jan. 25, 2021, provisional application No. 63/141,162, filed on Jan. 25, 2021, provisional application No. 63/141,179, filed on Jan. 25, 2021, provisional application No. 63/141,194, filed on Jan. 25, 2021, provisional application No. 63/141,205, filed on Jan. 25, 2021, provisional application No. 63/141,213, filed on Jan. 25, 2021, provisional application No. 63/141,227, filed on Jan. 25, 2021, provisional application No. 63/141,236, filed on Jan. 25, 2021, provisional application No. 63/141,245, filed on Jan. 25, 2021, provisional application No. 63/141,257, filed on Jan. 25, 2021, provisional application No. 63/141,263, filed on Jan. 25, 2021, provisional application No. 63/141,267, filed on Jan. 25, 2021.

(51) Int. Cl.

| | |
|---|---|
| *G06F 11/10* | (2006.01) |
| *G06F 11/14* | (2006.01) |
| *G06F 11/16* | (2006.01) |
| *G06F 11/20* | (2006.01) |
| *G06F 16/11* | (2019.01) |
| *G06F 16/178* | (2019.01) |
| *G06F 16/18* | (2019.01) |
| *H04L 9/08* | (2006.01) |
| *H04L 41/0659* | (2022.01) |
| *H04L 67/1095* | (2022.01) |
| *H04L 67/1097* | (2022.01) |

(52) U.S. Cl.
CPC .......... *G06F 3/0622* (2013.01); *G06F 3/0631* (2013.01); *G06F 3/064* (2013.01); *G06F 3/065* (2013.01); *G06F 3/0655* (2013.01); *G06F 3/0665* (2013.01); *G06F 3/067* (2013.01); *G06F 3/0689* (2013.01); *G06F 9/505* (2013.01); *G06F 11/1076* (2013.01); *G06F 11/1092* (2013.01); *G06F 11/1464* (2013.01); *G06F 11/1469* (2013.01); *G06F 11/1662* (2013.01); *G06F 11/2082* (2013.01); *G06F 11/2087* (2013.01); *G06F 11/2092* (2013.01); *G06F 11/2094* (2013.01); *G06F 16/128* (2019.01); *G06F 16/178* (2019.01); *G06F 16/1873* (2019.01); *H04L 9/0822* (2013.01); *H04L 41/0659* (2013.01); *H04L 67/1095* (2013.01); *H04L 67/1097* (2013.01); *G06F 2201/85* (2013.01)

(58) Field of Classification Search
CPC ...... G06F 3/065; G06F 3/0655; G06F 3/0665; G06F 3/067; G06F 3/0689; G06F 9/505; G06F 11/1076; G06F 11/1092; G06F 11/1464; G06F 11/1469; G06F 11/1662; G06F 11/2092; G06F 16/128; G06F 16/178; G06F 16/1873; G06F 2201/85; G06F 3/0605; G06F 3/0613; G06F 3/0659; G06F 11/2089; G06F 11/2069; G06F 11/2094; G06F 2201/82; G06F 2201/84; G06F 11/00; G06F 16/182; G06F 3/0658; H04L 41/0659; H04L 67/1095; H04L 67/1097; H04L 9/0897; H04L 9/3226
USPC .................. 707/639, 649, 704, 822
See application file for complete search history.

(56) References Cited

U.S. PATENT DOCUMENTS

| | | |
|---|---|---|
| 7,111,084 B2 | 9/2006 | Tan et al. |
| 7,313,724 B1 | 12/2007 | Kekre et al. |
| 7,334,095 B1 | 2/2008 | Fair et al. |
| 8,046,548 B1 | 10/2011 | Chatterjee et al. |
| 8,423,733 B1 | 4/2013 | Ozdemir |
| 8,743,872 B2 | 6/2014 | Chidambaram et al. |
| 8,751,533 B1 | 6/2014 | Dhavale et al. |
| 8,848,727 B2 | 9/2014 | Saraiya et al. |
| 9,112,890 B1 | 8/2015 | Ori |
| 9,405,483 B1 | 8/2016 | Wei et al. |
| 9,489,150 B2 * | 11/2016 | Aszmann ............... G06F 3/0689 |
| 9,613,046 B1 | 4/2017 | Xu et al. |
| 9,881,014 B1 | 1/2018 | Bono et al. |
| 10,210,048 B2 | 2/2019 | Sancheti |
| 10,365,978 B1 | 7/2019 | Whitney et al. |
| 10,460,110 B1 | 10/2019 | Allo et al. |
| 10,628,058 B1 | 4/2020 | Riley et al. |
| 10,642,779 B2 | 5/2020 | Zhu et al. |
| 10,782,997 B1 | 9/2020 | Krishna Murthy et al. |
| 11,461,109 B1 | 10/2022 | Krasilnikov et al. |
| 2004/0024962 A1 | 2/2004 | Chatterjee et al. |
| 2005/0050271 A1 | 3/2005 | Honda et al. |
| 2005/0074003 A1 | 4/2005 | Ball et al. |
| 2005/0240792 A1 | 10/2005 | Sicola et al. |
| 2005/0256961 A1 | 11/2005 | Alon et al. |
| 2006/0085607 A1 | 4/2006 | Haruma |
| 2007/0239944 A1 | 10/2007 | Rupanagunta et al. |
| 2008/0049276 A1 * | 2/2008 | Abe ....................... G06F 3/0665 |
| | | 358/1.16 |
| 2008/0162817 A1 | 7/2008 | Batterywala |
| 2009/0132617 A1 | 5/2009 | Soran et al. |
| 2009/0265510 A1 | 10/2009 | Walther et al. |
| 2010/0115008 A1 | 5/2010 | Nakatani et al. |
| 2010/0199042 A1 | 8/2010 | Bates et al. |
| 2010/0250748 A1 | 9/2010 | Sivasubramanian et al. |
| 2011/0246423 A1 | 10/2011 | Jess |
| 2011/0296102 A1 | 12/2011 | Nishihara et al. |
| 2012/0079318 A1 | 3/2012 | Colgrove et al. |
| 2012/0110252 A1 | 5/2012 | McKean |
| 2012/0117241 A1 | 5/2012 | Witt et al. |
| 2012/0147888 A1 | 6/2012 | Lu et al. |
| 2014/0047040 A1 | 2/2014 | Patiejunas et al. |
| 2014/0115162 A1 | 4/2014 | Kalyanaraman et al. |
| 2014/0215147 A1 | 7/2014 | Pan |
| 2014/0229675 A1 * | 8/2014 | Aizman ............... G06F 3/0634 |
| | | 711/117 |
| 2015/0006665 A1 | 1/2015 | Krishnamurthy et al. |
| 2015/0012701 A1 | 1/2015 | Cudak et al. |
| 2015/0120936 A1 | 4/2015 | Palan et al. |
| 2016/0004616 A1 | 1/2016 | Narita et al. |
| 2016/0077917 A1 | 3/2016 | Battepati et al. |
| 2016/0085588 A1 | 3/2016 | Rakitzis et al. |
| 2016/0179411 A1 | 6/2016 | Connor et al. |
| 2016/0210066 A1 | 7/2016 | Yamaura et al. |
| 2016/0246864 A1 * | 8/2016 | Boldt ....................... G06F 9/466 |
| 2016/0283126 A1 | 9/2016 | Bhagwat et al. |
| 2016/0342470 A1 | 11/2016 | Cudak et al. |
| 2017/0147437 A1 | 5/2017 | Borlick et al. |
| 2017/0192682 A1 | 7/2017 | Atia et al. |
| 2017/0286179 A1 | 10/2017 | Dimnaku et al. |
| 2018/0107409 A1 | 4/2018 | Condict et al. |
| 2018/0165169 A1 | 6/2018 | Camp et al. |
| 2018/0173554 A1 | 6/2018 | Caradonna et al. |
| 2018/0181348 A1 * | 6/2018 | Kusters ............... G06F 11/1076 |
| 2018/0260125 A1 | 9/2018 | Botes et al. |
| 2018/0314445 A1 | 11/2018 | Karale et al. |
| 2019/0004899 A1 | 1/2019 | Gao et al. |
| 2019/0028691 A1 | 1/2019 | Hinds et al. |
| 2019/0034104 A1 | 1/2019 | Agarwal et al. |
| 2019/0042090 A1 | 2/2019 | Raghunath et al. |
| 2019/0089537 A1 | 3/2019 | Gray |
| 2019/0163374 A1 | 5/2019 | Venkatesh et al. |
| 2019/0266103 A1 | 8/2019 | Pearson et al. |
| 2019/0354406 A1 | 11/2019 | Ganguli et al. |
| 2019/0357281 A1 | 11/2019 | Elbaz et al. |

(56) References Cited

U.S. PATENT DOCUMENTS

| | | |
|---|---|---|
| 2019/0386957 A1 | 12/2019 | Leon |
| 2020/0034077 A1 | 1/2020 | Haravu et al. |
| 2020/0065317 A1 | 2/2020 | Sarkar et al. |
| 2020/0081806 A1 | 3/2020 | Brown et al. |
| 2020/0117750 A1 | 4/2020 | Chen et al. |
| 2020/0136943 A1 | 4/2020 | Banyai et al. |
| 2020/0218617 A1 | 7/2020 | Knestele et al. |
| 2020/0233881 A1 | 7/2020 | Harduf et al. |
| 2020/0252290 A1 | 8/2020 | Puttagunta et al. |
| 2020/0265050 A1 | 8/2020 | Shimizu et al. |
| 2020/0285543 A1 | 9/2020 | Sancheti |
| 2020/0293499 A1* | 9/2020 | Kohli ................ G06F 3/067 |
| 2020/0310662 A1 | 10/2020 | Staab et al. |
| 2020/0310915 A1 | 10/2020 | Alluboyina et al. |
| 2020/0329101 A1 | 10/2020 | Kumar et al. |
| 2020/0348872 A1 | 11/2020 | Tylik et al. |
| 2020/0409797 A1 | 12/2020 | Mathew et al. |
| 2021/0109683 A1 | 4/2021 | Cain |
| 2021/0314400 A1 | 10/2021 | Longinov et al. |
| 2022/0027051 A1 | 1/2022 | Kant et al. |
| 2022/0075539 A1 | 3/2022 | Juch et al. |
| 2022/0191131 A1 | 6/2022 | Gupta et al. |
| 2022/0301157 A1* | 9/2022 | Soares ................ G16H 30/40 |
| 2022/0417004 A1 | 12/2022 | Sapuntzakis |
| 2023/0112764 A1* | 4/2023 | Nazari ............... H04L 67/1097 709/219 |

FOREIGN PATENT DOCUMENTS

| | | |
|---|---|---|
| EP | 3493046 A1 | 6/2019 |
| EP | 3663902 A1 | 6/2020 |
| WO | WO 2005/055043 A1 | 6/2005 |
| WO | WO 2016083837 A1 | 6/2016 |
| WO | WO 2018164782 A1 | 9/2018 |

OTHER PUBLICATIONS

Extended European Search Report for European Patent Application No. 22742392.8 dated Jun. 6, 2024, 10 pages.
Supplementary European Search Report for EP Patent Application No. 22742390.2 dated May 31, 2024, 4 pages.
Partial Supplementary European Search Report for EP Patent Application No. 22742391.0 dated Nov. 28, 2024, 16 pages.
Non Final Office Action for U.S. Appl. No. 18/273,188 mailed Oct. 18, 2024, 8 pages.
Non Final Office Action for U.S. Appl. No. 18/273,230 mailed Sep. 18, 2024, 27 pages.
Non Final Office Action for U.S. Appl. No. 18/273,240 mailed Sep. 16, 2024, 40 pages.
Non Final Office Action for U.S. Appl. No. 18/273,141 mailed Nov. 7, 2024, 24 pages.
Non Final Office Action for U.S. Appl. No. 18/273,137 mailed Nov. 21, 2024, 34 pages.
Non Final Office Action for U.S. Appl. No. 18/273,215 mailed Dec. 4, 2024, 12 pages.
Non Final Office Action for U.S. Appl. No. 18/273,174, mailed Nov. 22, 2024, 25 pages.
Non Final Office Action for U.S. Appl. No. 18/273,148, mailed Jan. 30, 2025, 11 pages.
Extended European Search Report for EP Patent Application No. 22742386.0 dated Nov. 28, 2024, 11 pages.
Extended European Search Report for EP Patent Application No. 22742388.6 dated Dec. 11, 2024, 59 pages.
Extended European Search Report for EP Patent Application No. 22742389.4 dated Dec. 3, 2024, 12 pages.
Partial Supplementary European Search Report for EP Patent Application No. 22742393.6 dated Dec. 11, 2024, 16 pages.
Partial Supplementary European Search Report for EP Patent Application No. 22742394.4 dated Dec. 11, 2024, 17 pages.
Partial Supplementary European Search Report for EP Patent Application No. 22742395.1 dated Dec. 16, 2024, 15 pages.
Partial Supplementary European Search Report for EP Patent Application No. 22742396.9 dated Dec. 4, 2024, 16 pages.
Partial Supplementary European Search Report for EP Patent Application No. 22742397.7 dated Dec. 18, 2024, 17 pages.
Final Office Action for U.S. Appl. No. 18/273,240 mailed Mar. 27, 2025, 29 pages.
Non Final Office Action for U.S. Appl. No. 18/273,162, mailed May 21, 2025, 13 pages.

* cited by examiner

PUBLISHED FILE SYSTEM AND METHOD

FIELD OF THE INVENTION

The present invention is directed to computer data rendering and processing systems and methods, and, more particularly, to the use of a designated orchestrator configured to manage and conduct a controlled exposure of relevant data.

BACKGROUND OF THE INVENTION

Current computing systems, whether local, remote or cloud computing-based (such as containers, private/public cloud, multi-cloud), require large amounts of data storage for actual as well as contingent use. Such data provision and management are usually made at designated data centers. Traditionally, the provision of used or expected to be used data is enabled by stacking physical data storing devices, e.g. hybrid hard drives (HHD), solid state drives (SSD), etc.

Such stacking creates what is termed 'storage arrays', or 'disk arrays' which are data storage systems for block-based storage, file-based storage, object storage, etc. Rather than storing data on a server, storage arrays use multiple storage medias in a collection capable of storing a significant amount of data and controlled by a local central controlling system.

Traditionally, a storage array controlling system provides multiple storage services so as to keep track of capacity, space allocation, volume management, snapshotting, error identification and tracking, encryption, compression, and/or other services. Services of such type require computing capacity, metadata categorization, data storage, accelerators, etc.—thus requiring the designation of significant infrastructure and budget capacities and resources.

Storage arrays are usually separated from system server operability which implements system and application operations on a dedicated hardware.

One of the services provided by traditional storage arrays is the provision of redundant arrays of independent disks (RAID) as a way of storing the same data in different places on multiple HHD or SSD in order to protect data in the case of a failure. There are different RAID levels, not all have the goal of providing redundancy though they may be oriented at improving overall performance and to increase storage capacity in a system.

Common hardware architecture would usually include a server stack, storage array stack and media I/O devices. The I/O devices being communicated to the servers via the storage stack.

To enable communality of operation of common hardware, the practice of Software-Defined Storage (SDS) was established as a common approach to data management in which data storage resources are abstracted from the underlying physical storage media hardware and therefore provide a flexible exploitation of available hardware and data storage.

SDS is also referred to in the art as hyper-converged infrastructure (HCI) which typically runs on commercial off-the-shelf servers. The primary difference between conventional infrastructure and HCI is that in HCI, both the storage area network and the underlying storage abstractions are implemented virtually in software rather than physically, in hardware.

Storage arrays and SDS solutions usually include integrated storage software stack for the management and control of data storage and its traffic.

Such integrated software stack provides storage maintenance services, such as data protection (e.g. backup, redundancy, recovery, etc.), high availability, space allocation, data reduction, data backup, data recovery, etc. In effect, the integrated software stack requires dedication of storage array resources to its control, management, administration and maintenance.

Such resources would need to address issues such as storage stack code, control protocol, nodes interconnect protocols, failure domain, performance, stack model, number of nodes in a cluster, etc. These services and requirements are traditionally provided locally per storage array and usually require update, management and overall administration.

Building and maintaining the integrated software stack may bear a high cost, inter alia, due to the multitude of services it is to provide and the large amount of clients (both on the media side as well as on the server side) the rate of reliability has to be very high, the code has to be efficient, and other fidelity considerations need to be taken into account. As a result, current storage arrays face challenges regarding their reliability, quality and performance.

A central storage array is usually configured to serve many clients, thus, even if large computing power is attributed to it, such power would be divided among said many clients. Due to its centrality, storage array or stack cluster errors or malfunctions immediately affect overall performance. The amount/number of storage arrays or stack clusters dedicated to data storage are considerably smaller and less available compared to resources dedicated to server systems, thus, as a matter of fact, the industry has gained much more 'track record' with servicing servers rather than with servicing data storages (e.g., leading to server related code to be debugged more frequently, be more efficient, and thereby be prone to less errors). Furthermore, the maintenance of such integrated software requires constant upkeep and update to technological advancement. As a result, the current quality and performance of the integrated software stack operation is not sufficiently high.

Modern operating systems, such as Linux and Windows Server, include a robust collection of internal storage components [(direct attached storage—(DAS)] which enable direct local services (such as encryption, compression, RAID, etc.) when central storage systems are not needed or not desired due to design requirements or due to the drawbacks attributed to storage arrays or data stack clusters.

The storage components are usually implemented in the kernel layer, assuring immediate access and thereby assuring high OS and/or application performance DAS is mostly limited to non-critical applications due to its inherent drawback due to the direct adverse effect of server communication failure which will directly hamper the accessibility to the data stored in the DAS. Thus, as a rule, enterprises do not use DAS for critical applications. Nevertheless, current modern server and operating systems are designed to include the services needed to support DAS capabilities.

Operating systems maturity provides stable components intended to be used in the enterprise although, due to the DAS reliability limitations, reliance on storage arrays is still a high priority consideration.

The raw components included in the OS server system to facilitate said direct local services (such as encryption, compression, RAID, etc.) are used today only for basic operating system DAS usage. Nevertheless, although many such components enabling the services are present in OS servers, nowadays they do not enable a full suite of data management and control services available from traditional storage array systems.

Modern file workloads, like those presented by AI and big-data applications' requirements, set very high bandwidth and very high input-output operations per second (IOPS) specifications. Currently, two solution groups exist: Network-attached storage and Clustered file system.

Network-attached storage (NAS) is a file-level computer data storage server connected to a computer network that provides data access to a heterogeneous group of clients.

The currently common controller-based architecture used to facilitate such NAS becomes a bottleneck between the drives and the network computers, thus effectively limiting the bandwidth and IOPS to very low numbers.

A clustered file system is a file system which is shared by being simultaneously mounted on multiple servers. Under such configuration, concurrency control becomes an issue when more than one client is accessing the same file and attempts to update it. Hence, updates to the file from one client should be coordinated so as not to interfere with access and updates from other clients. This problem is usually handled by concurrency control or locking protocols. Such lock and unlock operations consume relatively large amounts of time and adversely affect the bandwidth and IOPS by reducing it to low numbers. Such relatively large time and resources consumption may be attenuated when performing random access to small files.

Thus, the presented drawbacks of the currently available file systems leave room for the provision of better more efficient file management systems and methods that would provide a reliable, fast, cost-effective and comprehensive solution capable of providing reliable data rendering and orchestration as well as flexibility adapted for various conditions and concerns, and hence, providing real-time operation tailored to the various needs of the user.

SUMMARY OF THE INVENTION

The present invention provides a low latency file publishing system configuration which is lock-free and requires no controller to operate. Moreover, a high-read intensive workload is provided by the system's unique characteristics and enables various complex applications to be efficiently conducted.

The present invention further provides a designated orchestrator configured to publish multiple snapshot data versions configured to be exposed to designated reader server/s and thus, allows a multi-task data writing ability which is able to be simultaneously conducted while a previous data snapshot is being iterated. Hence, the present invention provides a reliable, fast, cost-effective and comprehensive file management solution capable of providing efficient data rendering and processing capabilities, as well as flexibility adapted for various conditions and concerns.

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

One aspect of the invention is a published file system or method comprising: at least one orchestrator designated to control a control plane (CP) of a data plane (DP) network; a writer server configured to write data, run an operating system and control the orchestrator; at least one storage media designated to host data produced by the writer server and accessible over the DP network, and at least one reader server designated to have a read-only access to the storage media over the DP network, wherein the writing procedure configured to be conducted by the writer server results in at least one data snapshot version, wherein the orchestrator is configured to accept a publish command that allows the reader server to access the DP network and expose the data snapshot version, and wherein new data version may be updated by the writer server and be hidden from the reader server until another publish command is accepted by the orchestrator. Reader servers may be located at different locations, wherein the orchestration is allocated across different resiliency domains while recognizing that the orchestration allocation may consider different resiliency domains and thereby further consider maintaining system balance.

According to some embodiments of the invention, exposing a data snapshot over the DP network allows an immediate system response and reduced latency. Additionally, the at least one media storage may be a read-only media storage stack and/or the data is backed upon at least two media storages.

According to some embodiments of the invention, multiple data snapshot versions may be written while the reader server is exposed to another, already published data snapshot version over the DP network.

According to some embodiments of the invention, the orchestrator is configured to recognize a specific snapshot data version made by the writer server and thus, configured to provide a uniform and reliable data stack for multiple reader servers via the DP network. According to some embodiments of the invention, upon publishing a new data snapshot version by the orchestrator, the reader servers are configured to refresh the allocation metadata. According to some embodiments of the invention, the system or method are further configured to use LVM in order to create a data snapshot version and enable parallel read by multiple reader server/s using a single writer server. According to some embodiments of the invention, the writer server may be configured to interact with at least two reader servers using a multipath connection. Otherwise the communication between either a reader or a writer server accessible via the DP network, and the orchestrator is done using a designated software component installed on each of said devices.

According to some embodiments of the invention, the general use of the system is configured to be utilized in order to perform an AI training conducted by the reader server/s or other high volume calculations' performance.

According to some embodiments of the invention, the path to the media storage is direct and each media storage is configured to run required storage stack services, such as a RAID, encryption, Logical Volume Manager (LVM), data reduction, and others. According to some embodiments of the invention, the writer server may be configured to utilize a RAID storage stack component (SSC) configured to provide data redundancy originated from multiple designated portions of the storage media.

According to some embodiments of the invention, the reader server is configured to cache metadata and data in RAM in order to provide reduced latency. According to some embodiments of the invention, further configuration is made to use a thin provisioning layer in order to create a data snapshot and enable parallel read by multiple reader server/s using a single writer server.

According to some embodiments of the invention, the orchestrator may be configured to interact with each server using an administration protocol; the storage media may be solid-state drive (SSD) based; the storage media is storage class memory (SCM) based; the storage media may be random access memory (RAM) based; the storage media may be hard disk drive (HHD) based; the orchestrator may be a physical component; the orchestrator may be a cloud-based service (SaaS); and/or the operations on each server may be implemented, wholly or partially, by a data processing unit (DPU).

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

In the Figures.

DETAILED DESCRIPTION OF SOME EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

The term "Controller", as used herein, refers to any type of computing platform or component that may be provisioned with a Central Processing Unit (CPU) or microprocessors, and may be provisioned with several input/output (I/O) ports.

Figure 1:
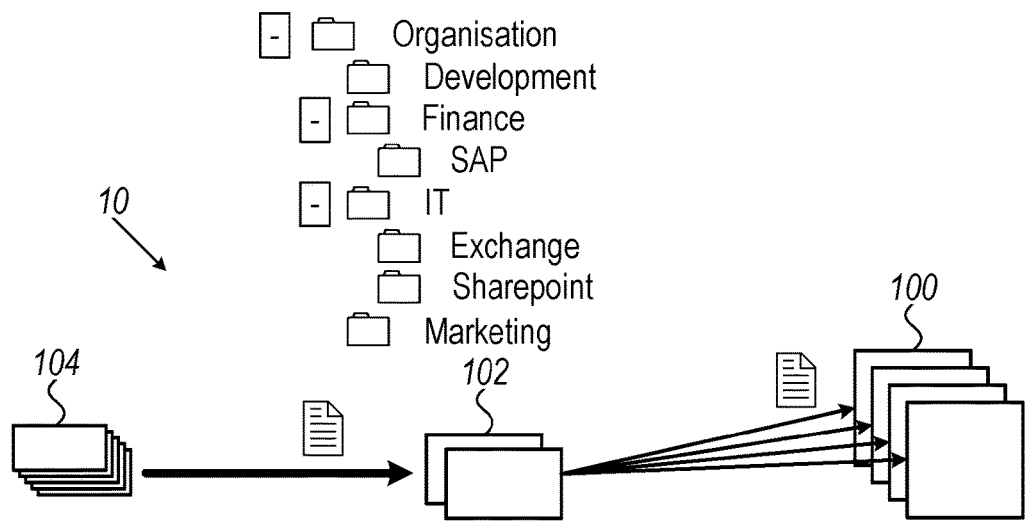
FIG. 1 constitutes a schematical illustration of a Network Attached Storage (NAS).

Reference is now made to FIG. 1, which schematically illustrates conventional network attached storage (NAS) 10. As shown, NAS 10 comprises at least one controller 102 designated to mediate, regulate and manage the connection between server/s 100 and storage media/s 104. File services are provided by the controller 102, that may, for example, locate any specific file stored on storage media 104, compress/extract files, send files to/from server 100 or perform any required computation regarding file rendering and control. Controller 102 is restricted in its ability to provide constant and fast data transfer rates, and hence, functions as a "bottle-neck" component that reduces the performance of NAS 10.

Figure 2:
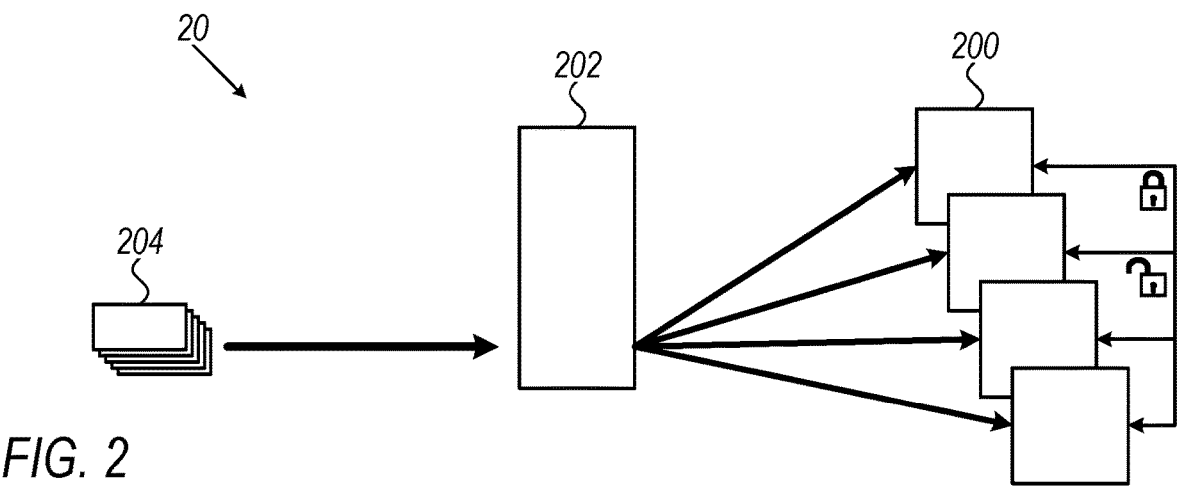
FIG. 2 constitutes a schematical illustration of a Clustered File System (CFS).

Reference is now made to FIG. 2, which schematically illustrates conventional clustered file system (CFS) 20. As shown, CFS 20 comprises at least one storage media/s 204 that may be stacked within block storage 202 and be connected to at least one server 200. CFS 20 may enable multiple servers to operate in the same DP network at the same time. In order to enable such a simultaneous operation, CFS 20 manages a complex protocol of "locks", in other words, data may be altered/read only after releasing a specific lock designated to ensure that all operations that have been conducted or being conducted by the CFS 20 are coordinated. Said system is usually implemented in high performance computing (HPC) configurations and provides adequate performance Nevertheless, such system is less effective in regulating and coordinating AI trainings and complex analytics since the requirement to create frequent locks causes substantial latency. Moreover, the need to request and get a locking permission from all participating severs requires substantial amount of computing resources and hence, reduces CFS 20' performances and rates.

Figure 3:
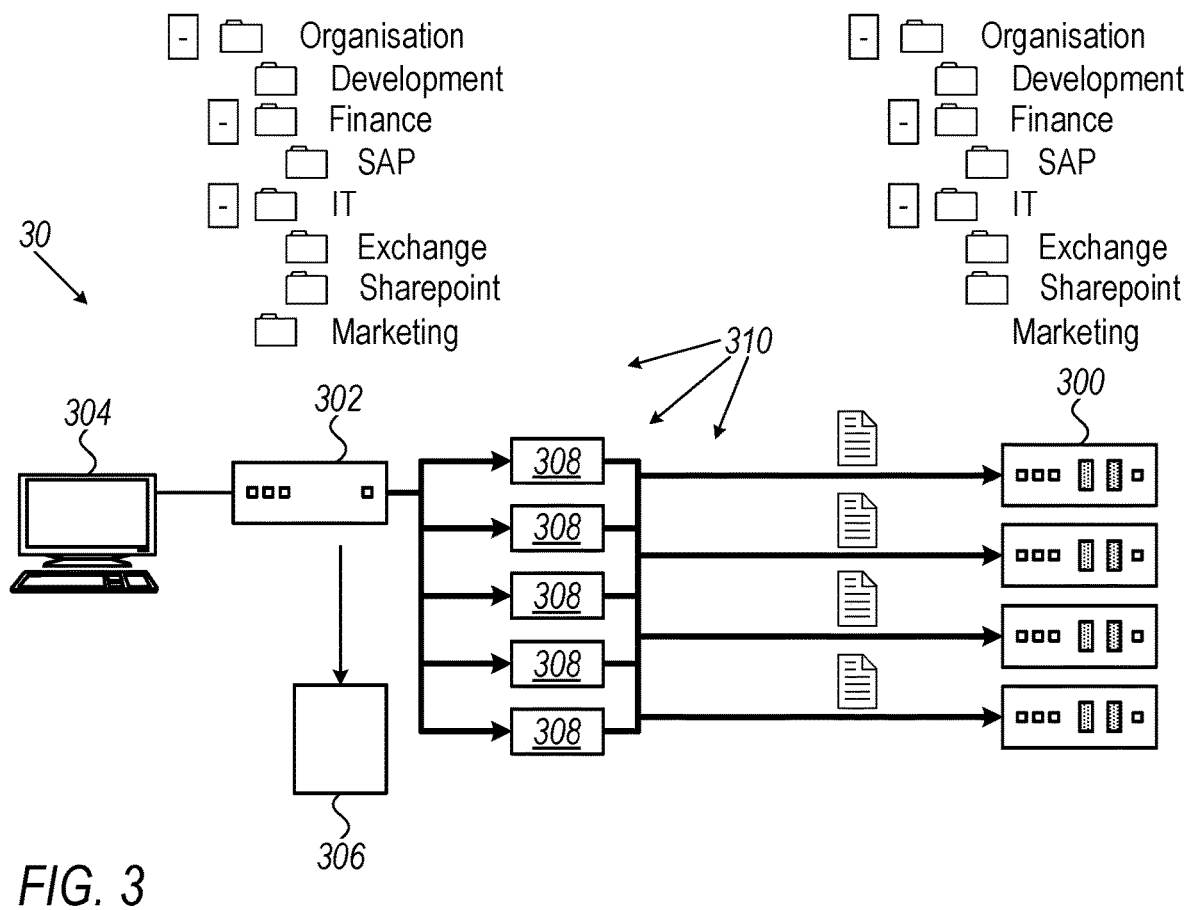
FIG. 3 constitutes a schematical illustration of a Published File System (PFS), according to some embodiments of the invention.

Reference is now made to FIG. 3, which schematically illustrates a published file system (PFS) 30 which is the subject matter of the current invention, according to some embodiments. As shown, PFS 30 comprises at least one media storage 308, at least one reader server 300 configured to a read-only configuration, a writer server 302 configured to control at least one orchestrator 306, which, in turn, is designated to mediate, regulate and manage the data between the PFS 30' various components. According to some embodiments, PFS 30 enables a low latency configuration which is lock-free and requires no controller to operate. Moreover, a high-read intensive workload capacity is provided by the system's unique configuration and enables various complex applications to be efficiently conducted.

According to some embodiments, the communication between reader servers 300 is conducted using orchestrator 306 and no communication is enabled between each reader server 300. As disclosed above, reader servers 300 are configured to a read-only configuration and are unable to write new data. This configuration allows, for example, the training of an AI model by exposing the model to vast data sets and conducting multiple iterations.

According to some embodiments, orchestrator 306 may be designated to control a control plane (CP) of a data plane (DP) network accessible to reader server/s 300. According to some embodiments, writer server 302 may be configured to run an operating system and control the orchestrator 306 by, for example, instructing it to conduct various tasks regarding data management and data coordination.

According to some embodiments, the orchestrator 306 may be a physical controller device or may be a cloud-based service (SaaS) and may be configured to command and arrange data storage and traffic in interconnected servers, regardless whether orchestrator 306 is a physical device or not.

According to some embodiments, user 304 may write data using the writer server 302, for example, user 304 may label various images in order to create a reference data set designated to train AI model using the reader server/s 300, etc.

According to some embodiments, the at least one storage media 308 is designated to host data produced by the writer server 302 and accessible over the DP network. According to some embodiments, the storage media 308 may be solid-state drive (SSD) based, class memory (SCM) based, random access memory (RAM) based, hard disk drive (HHD) based, etc.

According to some embodiments, the writer server 302 may be configured to write data and form at least one data snapshot version, for example, user 304 may conduct data labeling using the writer server 302 and record a snapshot version of the current data that has written and prepared, etc.

According to some embodiments, orchestrator 306 may be configured to accept a publish command sent by the writer server 300, wherein said command may allow reader server/s 300 to access the DP network and, hence, be exposed to said data snapshot version, now stored on storage media 308.

According to some embodiments, reader server/s 300 is designated to have a read-only access to storage media 308 over the DP network, for example, multiple reader servers 300 may sample and conduct large number of repeated iterations based on the data stored on media storage 308 as part of training an AI model, etc.

According to some embodiments, a new data version may be updated by the writer server 302 and be hidden from the reader server 300 until another publish command is accepted by the orchestrator 306. According to some embodiments, said procedure may be conducted with a minimal latency and lead to an immediate response that, in turn, may increase system's performance and provide very high data reading rates.

According to some embodiments, the at least one media storage 308 is a read-only media storage stack that may also be referred as a storage array 310, (or a disk array) and may be used for block-based storage, file-based storage, object storage, etc. Rather than store data on a server, storage array 310 may use multiple storage media 308 in a collection capable of storing a significant amount of data.

According to some embodiments and as previously disclosed, storage media 308 may be stacked to form storage array 310 and may perform the task of keeping or archiving digital data on different kinds of media. Main types of storage media include hard disk drives (HDDs), solid-state disks (SSDs), optical storage, tape, etc., wherein HDDs are configured to read and write data to spinning discs coated in magnetic media and SSDs store data on nonvolatile flash memory chips and have no moving parts. Optical data storage uses lasers to store and retrieve data from optical media, typically a spinning optical disc and tape storage records data on magnetic tape.

Traditionally, storage arrays are configured to manage a control system that provides multiple storage services so as to keep track of capacity, space allocation, volume management, snapshotting, error identification and tracking, encryption, compression, etc. Services of such type require significant computing capacity, metadata, data storage, accelerators, etc.

Usually, a storage array is separated from a system server's operability and is configured to implement system and application operations on dedicated hardware. For example, common storage array hardware architecture may include a server stack, storage array stack and media I/O devices. The I/O devices are configured to communicate with the servers via the storage stack.

According to some embodiments, storage stack 310 is configured to be controlled and managed by the orchestrator 306 and hence, require no integrated control system that requires vast resources as disclosed above.

According to some embodiments, the snapshot version/s produced by the writer server 302 may be backed upon at least two media storages 308. This redundancy enables an increased level of data integrity and provide adequate mitigation means in any case of data loss.

According to some embodiments, multiple data versions may be written by the writer server 302 while the reader server/s 300 is exposed to another, already published data snapshot version over the DP network. For example, a data scientist 304 may label multiple images and prepare a data set in order to provide an iteration volume designated to train an AI model, writer server 302 may then capture a snapshot version of said dataset and command the orchestrator 306 to publish said version over the DP network, server/s 300 may then be exposed to said version while the data scientist is free to utilize writer server 302 to perform another task, which, in due course, will also be snapshotted and create a new snapshot version designated to be published.

According to some embodiments, orchestrator 306 may be configured to recognize a specific written data version made by writer server 302, thus, orchestrator 306 may be configured to provide and manage a uniform and data reliable storage stack accessible to multiple reader servers 300 via the DP network.

According to some embodiments, an allocation method may be used to define how files are stored in storage media 308 and/or in storage stack 310. Different files or many files are stored on the same disk or spared and saved on different disks. The main problem that occurs how to allocate the location of these files so that the utilization of the media storage is efficient and enables a quick access.

According to some embodiments, upon publishing a new data snapshot version by the orchestrator 306, the reader server/s 300 may be configured to refresh the allocation metadata, and hence be provided with an updated metadata regarding to location of the relevant files in the updated snapshot version.

According to some embodiments, media storage 308 may have a direct path wherein each media storage 308 is configured to run required storage stack services, like RAID, encryption, logical volume manager (LVM), data reduction, etc.

According to some embodiments, reader server 302 is configured to cache metadata and data in RAM in order to provide reduced latency.

According to some embodiments, PFS 30 may use a LVM in order conduct a data snapshot that, in turn, will enable parallel read with a single writer server 302. According to some embodiments, PFS 30 may be configured to use a thin provisioning layer in order to conduct a data snapshot and enable parallel read with a single writer server.

According to some embodiments and as disclosed above, writer server 302 is configured to interact with at least two target servers 300 using a multipath connection. According to some embodiments, a multipath connection may be used to improve and enhance the connection reliability in provide a wider bandwidth.

According to some embodiments, the communication between the orchestrator 306 and between either writer server 302 or reader server 300, may be conducted via the DP network by utilizing a designated software component installed on each of said servers.

According to some embodiments, the writer server 302 may be designated to utilize a redundant array of independent disks (RAID) storage stack components (SSC) configured to provide data redundancy originated from multiple designated portions of the storage media 308. According to some embodiments, the RAID SSC are further configured to provide data redundancy originated from combined multiple initiator paths.

According to some embodiments, the orchestrator 306 may be configured to interact with server/s 300/302 using an administration protocol. According to some embodiments, a designated portion of the storage media 308 may be allocated using a logical volume manager (LVM) SSC. According to some embodiments, the storage media 308 may be solid-state drive (SSD) based, class memory (SCM) based, random access memory (RAM) based, hard disk drive (HHD) based, etc.

According to some embodiments, at least two reader servers 300 may be located at different locations, such as, in different rooms, buildings or even countries. In this case, the orchestration procedure conducted by the orchestrator 306 is allocated across different resiliency domains. For example, orchestrator 306 may consider various parameters regarding cyber security, natural disasters, financial forecasts, etc. and divert data flow accordingly. According to some embodiments, said orchestration procedure conducted by orchestrator 306 and configured to utilize servers' allocation, is conducted with a consideration of maintaining acceptable system balance parameters.

According to some embodiments, the orchestrator 306 may be a physical component such as a controller device or may be a cloud-based service (SaaS) and may be configured to command and arrange data storage and traffic in interconnected servers, regardless whether orchestrator 306 is a physical device or not.

According to some embodiments, the operations on each server/s 300/302 may be implemented, wholly or partially, by a data processing unit (DPU), wherein said DPU may be an acceleration hardware such as an acceleration card and wherein hardware acceleration may be use in order to perform specific functions more efficiently when compared to software running on a general-purpose central processing unit (CPU), hence, any transformation of data that can be calculated in software running on a generic CPU can also be calculated by custom-made hardware, or by some mix of both.

Figure 4:
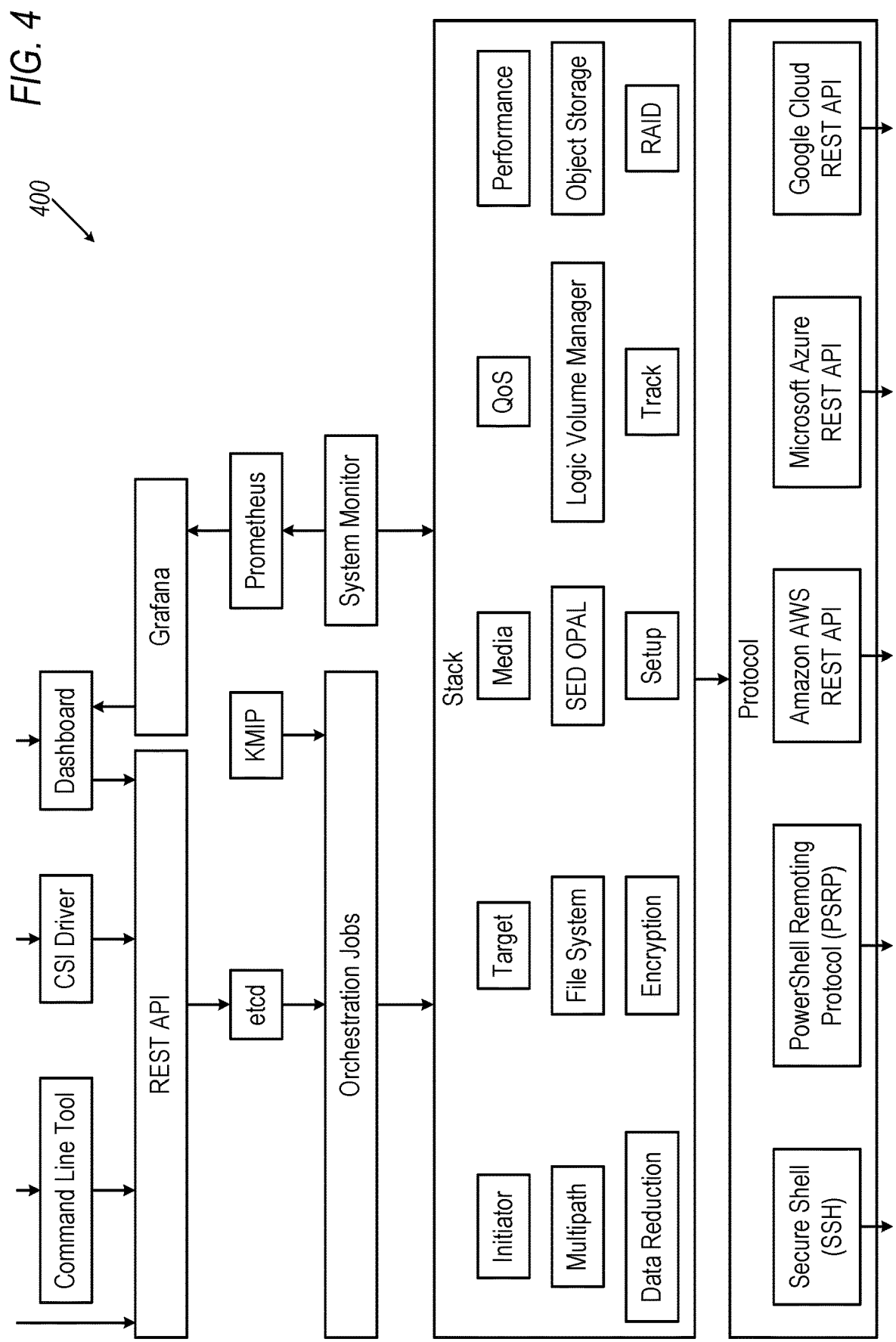
FIG. 4 constitute a schematical illustration of a PFS' general architecture, according to some embodiments of the invention.

Reference is now made to FIG. 4, which schematically illustrates a general architecture 400 of PFS 30, according to some embodiments. As shown, various components are configured to interact and provide the ability to publish separated snapshot versions over the DP network. for example, orchestration jobs may affect various stack components, which, in turn are translated and utilized through various cloud computing platforms/cryptographic network protocols/application programing interfaces such as SSH, PSRP, Amazon AWS, Microsoft Azure and Google cloud.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A non-centralized published file system, comprising:
   (i) at least one orchestrator designated to control a control plane (CP) of a data plane (DP) network,
   (ii) a single writer server configured to perform a writing procedure to write data, run an operating system and control the orchestrator,
   (iii) at least one storage media designated to host data produced by the writer server and accessible over the DP network, and
   (iv) a plurality of reader servers designated to have a read-only access to the storage media over the DP network,
   wherein the plurality of reader servers are not clustered nor configured with metadata that groups them with respect to the writer server, wherein the writing procedure configured to be conducted by the writer server results in at least one data snapshot version, wherein the operations of the plurality of reader servers are not locked by the writer server nor configured with respect to a metadata server, wherein the data written by the writer server is not required to be divided into blocks, wherein the orchestrator is configured to accept a publish command that allows the plurality of reader servers to access the DP network and expose the data snapshot version, wherein said at least one orchestrator is logically situated within the control plane and is the only feature of the network permitted to: access (a) the complete topology of the network; (b) access telemetry data of communications on the network; (c) define and amend policy relating to nodes on the network; and (d) allocate resources of the network, wherein the said single writer server is the only feature in the network permitted to write and edit data hosted on the plurality of reader servers, and wherein new data version may be updated by the writer server and be hidden from the reader server until another publish command is accepted by the orchestrator.

2. The system of claim 1, wherein exposing a data snapshot over the DP network allows an immediate system response and reduced latency.

3. The system of claim 1, wherein the at least one media storage is a read-only media storage stack.

4. The system of claim 1, wherein the data is backed upon at least two media storages.

5. The system of claim 1, wherein multiple data snapshot versions may be written while the reader server is exposed to another, already published data snapshot version over the DP network.

6. The system of claim 1, wherein the orchestrator is configured to recognize a specific snapshot data version made by the writer server and thus, configured to provide a uniform and reliable data stack for multiple ones of the at least one reader server via the DP network.

7. The system of claim 1, wherein upon publishing a new data snapshot version by the orchestrator, the at least one reader server is configured to refresh the allocation metadata.

8. The system of claim 1, wherein f the system is configured to be utilized in order to perform an artificial intelligence (AI) training conducted by the at least one reader server.

9. The system of claim 1, wherein the path to the media storage is direct and wherein each media storage is configured to run required storage stack services.

10. The system of claim 1, wherein the reader server is configured to cache metadata and data in random access memory (RAM) in order to provide reduced latency.

11. The system of claim 1, further configured to use a logical volume manager (LVM) in order to create a data snapshot version and enable parallel read by the at least one reader server using a single writer server.

12. The system of claim 11, further configured to use a thin provisioning layer in order to create a data snapshot and enable parallel read by the at least one reader server using a single writer server.

13. The system of claim 1, wherein the writer server is configured to interact with at least two reader servers using a multipath connection.

14. The system of claim 1, wherein the communication between either a reader or a writer server accessible via the DP network, and the orchestrator is done using a designated software component installed on each of said devices.

15. The system of claim 1, wherein the writer server is configured to utilize a redundant array of independent disk (RAID) storage stack component (SSC) configured to provide data redundancy originated from multiple designated portions of the storage media.

16. The system of claim 1, wherein the at least one reader server comprises at least two reader servers located at different locations, wherein the orchestration is allocated across different resiliency domains.

17. The system of claim 16, wherein the orchestration allocated while considering different resiliency domains, and further considers maintenance of system balance.

18. The system of claim 1, wherein the orchestrator is configured to interact with each server using an administration protocol.

19. The system of claim 1, wherein the operations on each server may be implemented, wholly or partially, by a data processing unit (DPU).

20. A method for operating a non-centralized published file system, comprising the following steps:
(i) using at least one orchestrator designated to control a control plane (CP) of a data plane (DP) network,
(ii) configuring a single writer server to perform a writing procedure to write data, run an operating system and control the orchestrator,
(iii) designating at least one storage media to host data produced by the configured writer server and having it accessible over the DP network, and
(iv) designating a plurality of reader servers to have a read-only access to the storage media over the DP network,
wherein the configuring of the writing procedure is to be conducted by the writer server is to result in at least one data snapshot version,
wherein the plurality of reader servers are neither clustered nor configured with metadata that groups them with respect to the writer server, wherein the designation of the orchestrator is configured to accept a publish command that allows the plurality of reader servers to access the DP network and expose the data snapshot version, wherein the operations of the plurality of reader servers are not locked by the writer server nor configured with respect to a metadata server,
wherein the data written by the single writer server is not required to be divided into blocks,
wherein the orchestrator is configured to accept a publish command that allows the plurality of reader servers to access the DP network and expose the data snapshot version, wherein said at least one orchestrator is logically situated within the control plane and is the only feature of the network permitted to: access (a) the complete topology of the network; (b) access telemetry data of communications on the network; (c) define and amend policy relating to nodes on the network; and (d) allocate resources of the network, and
wherein updating of a new data version may be obtained by the writer server and be hidden from the reader server until another publish command is accepted by the orchestrator.

* * * * *